United States Patent [19] [11] Patent Number: 4,753,966
Haas et al. [45] Date of Patent: Jun. 28, 1988

[54] MOLD RELEASE COMPOSITION, MIXTURES CONTAINING THIS MOLD RELEASE COMPOSITION, A PROCESS FOR THE PRODUCTION OF ELASTOMERIC MOLDED PRODUCTS, AND THE MOLDED PRODUCTS OBTAINED BY THIS PROCESS

[75] Inventors: Peter Haas, Haan; Christian Weber, Leverkusen, both of Fed. Rep. of Germany

[73] Assignee: Bayer Aktiengesellschaft, Leverkusen, Fed. Rep. of Germany

[21] Appl. No.: 119,606

[22] Filed: Nov. 12, 1987

[30] Foreign Application Priority Data

Nov. 20, 1986 [DE] Fed. Rep. of Germany ....... 3639502

[51] Int. Cl.$^4$ .............................................. C08G 18/14
[52] U.S. Cl. .................................. 521/51; 252/182 B; 252/182.24; 252/182.27; 521/125; 521/130; 524/714; 524/718; 524/719; 524/720; 524/773; 528/52; 528/53
[58] Field of Search ......................... 521/51, 125, 130; 524/714, 718, 719, 720, 773; 528/52, 53; 252/182

[56] References Cited

U.S. PATENT DOCUMENTS 4,218,543 8/1980 Weber et al. .......................... 521/51
4,519,965 5/1985 Taylor et al. .......................... 264/51
4,581,386 4/1986 Taylor et al. .......................... 521/125
4,585,803 4/1986 Nelson et al. .......................... 521/105

FOREIGN PATENT DOCUMENTS 081701 6/1983 European Pat. Off. .
119471 9/1984 European Pat. Off. .

Primary Examiner—Maurice J. Welsh
Attorney, Agent, or Firm—Gene Harsh; Joseph C. Gil; Thomas W. Roy

[57] ABSTRACT

The present invention is directed to a mold release composition which is a solution, liquid at room temperature, of
(A) at least one zinc salt of a straight chain or branched, saturated or unsaturated aliphatic carboxylic acid containing 8 to 24 carbon atoms in
(B) at least one organic compound containing nitrogen which is liquid at room temperature, the solution containing the zinc salt in a quantity of about 10 to 75% by weight, based on the total weight of the composition.

The present invention is additionally directed to an isocyanate reactive mixture containing isocyanate reactive compounds and the above described mold release composition. The present invention is further directed to a process for the preparation of molded products based on the above mixture and to the molded products obtained according to this process.

14 Claims, No Drawings

MOLD RELEASE COMPOSITION, MIXTURES CONTAINING THIS MOLD RELEASE COMPOSITION, A PROCESS FOR THE PRODUCTION OF ELASTOMERIC MOLDED PRODUCTS, AND THE MOLDED PRODUCTS OBTAINED BY THIS PROCESS

BACKGROUND OF THE INVENTION

1. Field of the Invention

This invention relates to a new mold release composition for the production of molded products with self-releasing properties based on polyurethanes or polyureas, a mixture of compounds with isocyanate reactive groups containing this composition, a process for the production of elastomeric molded products having a closed surface layer using these mixtures and the molded products obtained by this process.

2. Description of the Prior Art

The production of elastic molded products based on polyurethanes or polyureas by the reaction of mixtures of a polyisocyanate component, relatively high molecular weight compounds containing isocyanate reactive groups, low molecular weight chain lengthening agents and auxiliary agents and additives inside closed molds is known, for example from DE-AS No. 2,622,951 or EP-B No. 0,081,701. In these prior art processes, the reaction mixtures are generally prepared in accordance with the reaction injection molding (RIM) method and introduced into their mold immediately after they have been prepared. The resulting molded products are generally removed after a very short time in the mold. For carrying out this process in practice, especially for a large scale production of such molded parts, the ease with which the product can be released from its mold is of major importance. This is determined to a large extent not only by the use of "external mold release agents," i.e. mold release compositions used to coat the mold before it is filled, but also by the use of so-called "internal mold release agents." These "internal mold release agents" are incorporated in the reaction mixture, with the result that the molded product obtained adheres less firmly to the surface of the mold than it would if it contained no mold release agent. For the production of elastomeric molded products, in particular with a density in the range of 0.8 to 1.4 g/cm$^3$, combinations of zinc salts of long chained carboxylic acids, in particular zinc stearate, and certain organic compounds containing tertiary amine nitrogen atoms have proved to be very suitable. An example of a typical compound of this kind containing tertiary amine nitrogen atoms is the addition product of about 5 mol of propylene oxide to 1 mol of ethylene diamine. These compounds containing tertiary amine nitrogen atoms act as solvents for the zinc salt which is generally only sparingly soluble and at the same time they impart a certain solubility to the zinc stearate in the mixtures of compounds containing isocyanate reactive groups with which the polyisocyanates are to undergo reaction. Mold release compositions of this kind and their use for the production of elastic molded products have been described, for example, in U.S. Pat. Nos. 4,519,965, 4,581,386 and 4,585,803.

One disadvantage of these prior art mold release compositions, however, is that they have only a limited capacity to impart solubility, with the result that when they are added to mixtures of compounds containing isocyanate reactive groups of the kind used in the process described above, the mixtures must be worked up immediately after addition of mold release composition since the mold releasing effect diminishes rapidly when the mixtures are left to stand. In practice, therefore, the mold release compositions are generally added to the compounds containing isocyanate reactive groups only shortly before manufacture of the molded products. The same, incidentally, also applies to mold release compositions consisting of zinc salts, in particular zinc stearate, and compounds containing primary amino groups, for example the compositions recommended in EP-A No. 0,119,471.

It was an object of the present invention to provide new mold release compositions which would not have the disadvantage of rapidly losing their mold release effect when stored in the mixtures used to prepare the molding.

This problem has now been solved by means of the mold release compositions according to the invention which are described below. These mold release compositions according to the invention contain certain selected tertiary amines of the kind described below as solvents or compatibility imparting agents for the zinc salt, in particular zinc stearate. The mold release compositions according to the invention are distinguished in particular by a combination of the following advantages:

1. The mold release effect obtained with the new mold release compositions is at least equal to that obtainable with prior art mold release compositions.
2. Mixtures of compounds containing isocyanate reactive groups of the kind used for the production of elastomeric molded products and containing the mold release compositions according to the invention need not be worked up immediately after their preparation (i.e., addition of the mold release composition to the other components) since molded products with excellent self-releasing properties can be obtained from the completely prepared mixtures even if these mixtures have been kept in storage. In practice this means that the manufacture of molded products need no longer prepare fresh mixtures at frequent intervals by mixing the mold release composition with the other compounds.

SUMMARY OF THE INVENTION

The present invention is directed to a mold release composition comprising a solution, which is liquid at room temperature, of (A) about 10 to 75% by weight, based on a total weight of components (A) and (B) of at least one zinc salt of a straight chain or branched, saturated or unsaturated aliphatic carboxylic acid having 8 to 24 carbon atoms in (B) at least one organic compound which is liquid at room temperature and corresponds to the formula

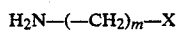

wherein
X denotes an organic group containing nitrogen and/or oxygen, selected from the following:

(i)

-continued

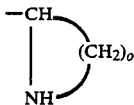
(ii)

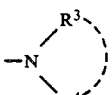
(iii)

—O—R⁵ (iv)
and
—NH—R⁷ (v)

wherein
R¹ and R² denote identical or different alkyl groups having 1 to 10 carbon atoms or together with the nitrogen atom and optionally oxygen or a $C_1$-$C_5$-alkyl substituted nitrogen atom as an additional hetero atom form a heterocyclic ring containing 6 ring atoms,
R³ and R⁴ denote identical or different alkyl groups with 2 to 10 carbon atoms or together with the nitrogen atom and optionally an oxygen atom or a $C_1$-$C_5$-alkyl substituted nitrogen atom as an additional hetero atom form a heterocyclic ring containing 6 ring atoms,
R⁵ denotes a straight chain or branched alkyl group with 2 to 10 carbon atoms or a group of the formula

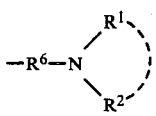

wherein
R⁶ represents a straight chain or branched alkylene group with 2 to 8 carbon atoms and R¹ and R² have the meanings already indicated,
R⁷ denotes an alkyl group with 3 to 10 carbon atoms,
m represents an integer with a value from 2 to 10,
n represents an integer with a value from 2 to 5 and
o represents an integer with a value from 2 to 8.

The present invention is further directed to a mixture which is a suitable reactant for organic polyisocyanates and contains
(a) at least one organic compound in the molecular weight range of 400 to 12,000 having at least two isocyanate reactive groups,
(b) about 5 to 50% by weight, based on the weight of component (a), of at least one organic compound in the molecular weight range of 62 to 399 which contains isocyanate reactive hydrogen atoms and is difunctional in isocyanate addition reactions and
(c) at least one mold release agent
characterized in that component (c) is a mold release composition of the kind mentioned above and is present in such a quantity that the mixture contains about 0.5 to 10 parts by weight of zinc stearate per 100 parts by weight of component (a).

The present invention is also directed to a process for the production of elastomeric molded products having a compact surface layer from polyurethane or polyurea elastomers by the reaction inside closed molds of a reaction mixture containing I: a polyisocyanate component containing at least one di- or polyisocyanate in which all of the isocyanate groups are aromatically bound
and
II: a reactant containing an internal mold release agent and compounds containing isocyanate reactive groups
characterized in that mixtures of the kind described above are used as component II.

The invention is finally directed to molded products obtained by this process.

DETAILED DESCRIPTION OF THE INVENTION

In the context of the present invention, the term "polyurethane" is used to include polyurethanes containing urea groups but the term "polyurea" is used only for polyureas which are free from urethane groups.

Component (A) of the mold release composition according to the invention contains at least one zinc salt of an organic carboxylic acid with 8 to 24 carbon atoms which may be branched and/or olefinically unsaturated. Examples of suitable zinc salts include zinc octoate, zinc stearate, zinc oleate, zinc palmitate and zinc laurate and any mixtures of such zinc salts. Component (A) of the mold release composition according to the invention is preferably zinc stearate.

Component (B) is based on special organic compounds of the kind defined above containing amino groups or of mixtures of such compounds. It is particularly advantageous to use compounds corresponding to the general formula $$H_2N—(—CH_2)_m—X$$

wherein
X denotes a group of the formula

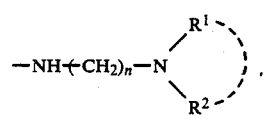
(i)

wherein
R¹ and R² denote identical or different alkyl groups containing 1 to 10, preferably 1 to 8 carbon atoms or together with the nitrogen atom form a 6-membered heterocyclic ring which may contain an oxygen atom or a $C_1$-$C_5$-alkyl, preferably a methyl-substituted nitrogen atom as a second hetero atom and
n represents an integer with a value from 2 to 5; or
X may denote a group of the formula

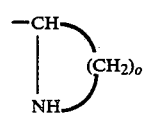
(ii)

wherein
o represents an integer with a value from 2 to 8, preferably 3 to 6;
or X may denote a group of the formula

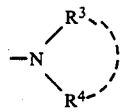 (iii)

wherein
R³ and R⁴ denote alkyl groups with 2 to 10, preferably 3 to 8 carbon atoms or together with the nitrogen atom form a 6-membered heterocyclic ring which may contain an oxygen atom or a $C_1$–$C_5$-alkyl substituted, preferably a methyl substituted nitrogen atom as an additional hetero atom; or X denotes a group of the formula —O—R⁵ (iv), wherein
R⁵ denotes an alkyl group with 2 to 10, preferably 4 to 8 carbon atoms or a group of the formula

wherein
R⁶ denotes a straight chained alkylene group with 2 to 8, preferably 2 to 6 carbon atoms;
or
X denotes a group of the formula —NH—R⁷ (v)

wherein
R⁷ denotes an alkyl group with 3 to 10, preferably 3 to 6 carbon atoms and
m in all cases has the value of 2 to 10, preferably 2 or 3.

The compounds corresponding to formulae (1) to (16) shown below are typical examples of such amino compounds:

 (1)

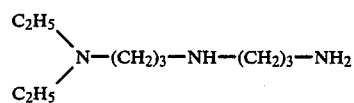 (2)

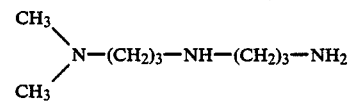 (3)

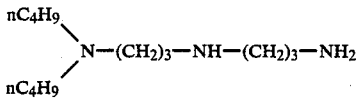 (4)

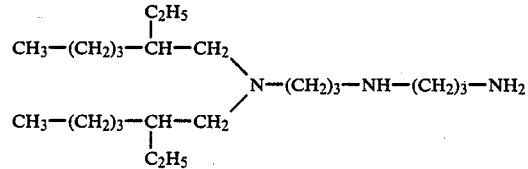

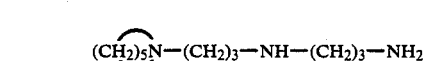 (5)

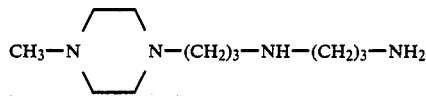 (6)

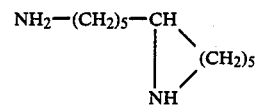 (7)

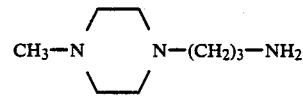 (8)

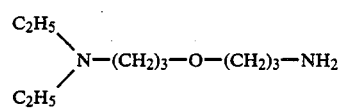 (9)

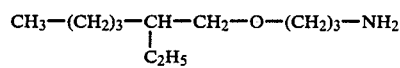 (10)

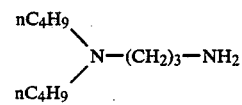 (11)

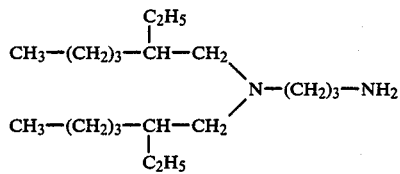 (12)

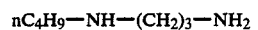 (13)

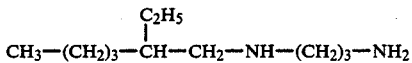 (14)

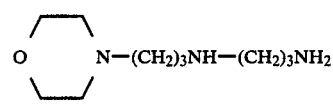 (15)

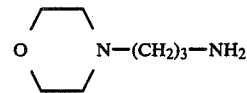 (16)

Component (B) of the mold release compositions according to the invention may also contain any mixtures of such amines. The compounds corresponding to formulae (1) to (7) and (13), (14) and (15) are particularly preferred as they can be incorporated bifunctionally.

The effect of these compounds for imparting solubility to component (A) is particularly surprising since quite minor structural changes in many cases virtually eliminates this effect. If, for example, in formulae (1) to (6) the segment

—NH—(CH₂)₃—NH₂ is replaced by the segment

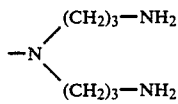

then the effect is lost. It is also lost when compound (8) is replaced by the compound of the formula

Components (A) and (B) are present in such proportions in the mold release compositions according to the invention that the proportion by weight of zinc salts, based on the total weight of components (A) and (B), is in the region of about 10 to 75% by weight, preferably about 40 to 60% by weight.

The mold release compositions are prepared by simply mixing the individual components at room temperature or moderately elevated temperature. Clear solutions of the zinc salt in the compounds containing tertiary amino groups are obtained.

The mixtures according to the invention of compounds containing isocyanate reactive groups contain the above-mentioned individual components (a), (b) and (c) and optionally also other auxiliary agents and additives (d).

Component (a) is generally a polyether in the molecular weight range of 400 to about 12,000, preferably about 1,800 to 12,000 and most preferably about 2,000 to 6,000 containing 2 to 3 isocyanate reactive groups. Mixtures of such polyethers containing a statistical average of 2 to 3 isocyanate reactive groups may also be used. The isocyanate reactive groups are selected from primary hydroxyl groups, secondary hydroxyl groups and primary amino groups, which groups may in turn be attached either to aliphatic or to aromatic carbon atoms. Any mixtures of such compounds containing isocyanate reactive groups may be used and the isocyanate reactive groups in the polyethers used may consist partly of hydroxyl groups and partly of amino groups of the type mentioned above. Component (a) and individual components which make up component (a) are preferably based on polyether polyols in which the hydroxyl groups are predominantly (more than about 50%, in particular more than about 80%, based on all of the hydroxyl groups) of primary hydroxyl groups, or polyethers in which the isocyanate reactive groups are aromatically bound primary amino groups.

The compounds used as component (a) may therefore be polyether polyols of the kind described in DE-AS No. 2,622,951 (U.S. Pat. No. 4,218,543, herein incorporated by reference in its entirety), polyether polyols of the kind mentioned in EP-B No. 0,017,928 (U.S. Pat. No. 4,298,701, herein incorporated by reference in its entirety) or polyether polyols of the kind mentioned in EP-B No. 0,044,481 (U.S. Pat. No. 4,379,105, herein incorporated by reference in its entirety) or mixtures of such polyether polyols or polyethers containing amino groups and optionally hydroxyl groups such as those mentioned in EP-B No. 0,081,701. The last mentioned polyethers are preferably those with amino groups, which may be obtained by the hydrolysis of compounds containing terminal isocyanate groups, for example, according to DE-OS No. 2,948,419 or U.S. Pat. Nos. 4,515,923, 4,525,590 and 4,540,720, all of which are herein incorporated by reference in their entirety.

Component (b) contains chain lengthening agents in the molecular weight range of 62 to 399, i.e. in particular compounds which are difunctional in isocyanate addition reactions and contain primary alcoholic hydroxyl groups or aromatically bound primary amino groups. Component (b) could in principle also contain minor quantities of compounds which are higher than difunctional in order to ensure branching of the resulting polyurethanes or polyureas if desired.

The following are examples of suitable chain lengthening agents (b).

(b¹) Polyhydroxyl compounds in the above mentioned molecular weight range such as ethylene glycol, propylene glycol, diethylene glycol, dipropylene glycol, 1,3-dihydroxypropane, 1,4-dihydroxybutane, 1,6-dihydroxyhexane, trimethylolpropane or glycerol;

(b²) Diamines containing aromatically bound primary amino groups such as 1,4-diaminobenzene, 2,4-diaminotoluene, 2,4'- and/or 4,4'-diaminodiphenylmethane or, preferably, aromatic diamines of the kind containing an alkyl substituent in at least one ortho-position to each amino group, in particular those containing at least one alkyl substituent in the ortho-position to the first amino group and two alkyl substituents, each with 1 to 4 carbon atoms, in the ortho-position to the second amino group. Particularly preferred are those diamines of the kind which contain an ethyl, n-propyl and/or isopropyl substituent in at least one ortho-position to the amino groups and optionally methyl substituents in other ortho-positions to the amino groups. The following are examples of such preferred or particularly preferred diamines: 2,4-diamino-mesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraisopropyl-4,4'-diaminodiphenylmethane and any mixtures of such diamines. 1-methyl-3,5-diethyl-2,4-diaminobenzene and commercial mixtures thereof with up to about 35% by weight of 1-methyl-3,5-diethyl-2,6-diaminobenzene, based on the mixture, are particularly preferred.

Mixtures of the diamines exemplified above with polyhydroxyl compounds of the type exemplified could also be used as component (b).

The mixtures according to the invention generally contain component (b) in quantities of about 5 to 50% by weight, preferably about 12 to 26% by weight, based on the weight of component (a).

Component (c) of the mixtures according to the invention are the mold release compositions according to the invention. These mold release compositions are present in such quantities in the mixtures according to the invention that the mixtures contain about 0.5 to 10 parts by weight, preferably about 1 to 4 parts by weight of zinc stearate to 100 parts by weight of component (a).

The auxiliary agents and additives (d) optionally present in the mixtures according to the invention are known, such as those described, for example, in EP-B No. 0,081,701, column 6, line 40 to column 9, line 31. The following should be particularly mentioned.

(d¹) State of the art mold release agents of the kind described, for example, in DE-OS No. 1,953,637, DE-OS No. 2,121,670, DE-OS No. 2,431,968, DE-OS No. 2,404,310, DE-OS No. 2,319,648, DE-OS No. 2,356,692, DE-OS No. 2,363,452, DE-OS No. 2,427,273 or DE-OS No. 2,431,968, which may optionally be used in addition to the mold release component (c) according to the invention. It is also possible to also use the mold release agents described in U.S. Pat. No. 4,519,965 or U.S. Pat. No. 4,581,386 together with the mold release component (c) according to the invention. This means above all that component (c) may also contain the compatibilizers described in these patents in addition to components (A) and (B). Thus it may, for example, be appropriate to also add to the mixture of components (A) and (B) amine-initiated polyetherpolyols such as the addition product of 5 moles of propylene oxide to 1 mol of ethylene diamine and/or polyether polyamines having primary amino groups such as polypropylenoxides having terminal primary amino groups and molecular weights of from 200 to 600 which components may be present in component (c) in an amount of up to 80% by weight, preferably up to 50% by weight and more preferably up to 30% by weight based on the total weight of component (c).

(d²) Catalysts for the isocyanate polyaddition reaction, in particular tertiary amines or organic tin compounds of which examples are given in EP-B No. 0,081,701. These catalysts, used in quantities of about 0.01 to 10% by weight, preferably about 0.05 to 2% by weight, based on the weight of component (a), are added particularly if component (a) consists predominantly or exclusively of polyether polyols of the type exemplified above. If components (a) and (b) consist exclusively of compounds containing amino groups, catalysts may also be added but are generally superfluous.

Components (a) to (d) may be mixed together in any sequence for the preparation of the mixtures according to the invention. Thus, for example, a "premix"0 may first be prepared from component (c) and at least part of component (b), for example an aromatic diamine of the type mentioned above, and this premix may subsequently be added to the other components, i.e. at some later time. The premix may contain, for example, up to 80% by weight, preferably up to 50% by weight and more preferably up to 30% by weight of such aromatic diamines, based on the total weight of the premix.

In the process according to the invention, the mixtures according to the invention of mold release compositions and compounds containing isocyanate reactive groups are reacted with organic polyisocyanates I. Polyisocyanates containing exclusively aromatically bound isocyanate groups such as those described, for example in EP-B No. 0,081,701, column 3, line 30 to column 4, line 25, are suitable for use as polyisocyanates I.

Polyisocyanates and polyisocyanate mixtures of the diphenylmethane series which are liquid at room temperature and optionally contain urethane groups and/or carbodiimide groups and/or uretoneimine groups are particularly suitable for use as component I. The term "polyisocyanates and polyisocyanate mixtures of the diphenylmethane series" is used here to include both polyisocyanate mixtures which are obtainable in a known manner by the phosgenation of aniline/formaldehyde condensates and the diisocyanate fractions which may be separated from these mixtures by distillation. Derivatives of 4,4'-diisocyanato-diphenyl-methane which are liquid at room temperature are among the particularly preferred polyisocyanates I. These include, for example, the polyisocyanates containing urethane groups which may be prepared according to DE-PS No. 1,618,380 by the reaction of 1 mol of 4,4'-diisocyanato-diphenylmethane with about 0.05 to 0.3 mol of low molecular weight diols or triols, preferably polypropylene glycols having a molecular weight below 700, or diisocyanates based on 4,4'-diisocyanatodiphenylmethane and containing carbodiimide and/or uretoneimine groups, which may be prepared, for example, as described in U.S. Pat. Nos. 3,152,162, 3,384,653, 3,429,256, DE-OS No. 2,537,685 or EP-A No. 5,233. The corresponding modification products based on mixtures of 2,4'- and 4,4'-diisocyanatodiphenylmethane or mixtures of the described modified 4,4'-diisocyanato-diphenylmethane with minor quantities of higher than difunctional polyisocyanates of the diphenylmethane series, for example those described in DE-OS No. 2,624,526, are also preferred polyisocyanates.

Polyisocyanate component I used in the process according to the invention is reacted with component II, i.e. the mixture according to the invention containing the mold release composition and the compounds with isocyanate reactive groups. The quantity of polyisocyanate component I used for this reaction is calculated to provide about 0.7 to 1.3, preferably about 1.0 to 1.2 isocyanate groups of component I for every isocyanate reactive group of component II (corresponding to an NCO index of about 70 to 130, preferably about 100 to 120). The primary and secondary amino groups present in component (c) are included in this calculation but not the carboxyl groups present in additional mold release agents.

The process according to the invention is preferably carried out by the known reaction injection molding technique (RIM process). In this process, the individual components I and II are mixed together and then immediately introduced into the mold. The quantity of mixture (which may be a foamable mixture) introduced into the mold is generally calculated to result in molded products having a density of about 0.25 to 1.4 g/cm$^3$, preferably about 0.8 to 1.4 and most preferably about 0.9 to 1.2 g/cm$^3$. The molded products obtained may have a density above about 1.2 g/cm$^3$, especially if mineral fillers are used. It may be seen from the figures given for the densities that the molded products according to the invention are preferably solid or at most microcellular synthetic resins. The molded products may generally be removed from the mold after about 5 to 90, preferably about 20 to 60 seconds, exactly in accordance with the teaching of DE-AS No. 2,622,951 or EP-B No. 0,081,701.

The starting temperature for the mixture introduced into the mold is generally chosen within the range of about 10° to 60° C., preferably about 20° to 50° C. The temperature of the mold is generally about 40° to 140° C., preferably about 5° to 70° C.

The process according to the invention is suitable in particular for the production of high quality elastomeric molded products which are suitable in particular for the manufacture of flexible motor vehicle bumpers and car body elements.

Compared with similar molded products known in the art, the molded products according to this invention are distinguished by the generally greater ease with which they can be removed from the mold. This improvement is also obtained if component II used in the process according to the invention has not been prepared immediately before use by mixing the mold release composition according to the invention with the other constituents of of component II. The excellent self-releasing properties of the molded products according to the invention are to a large extent independent of the "age" of component II.

The invention is further illustrated but is not intended to be limited by the following examples in which all parts and percentages are by weight unless otherwise specified.

EXAMPLES

Examples 1 to 9

(Preparation of amino compounds suitable for use as component (B) according to the invention)

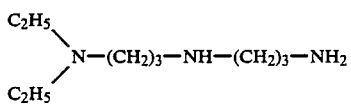  1.

530 ml of acrylonitrile were added dropwise to 1040 g (8 m) of diethylpropylenediamine in 500 ml of methanol at 20° C. The mixture was stirred overnight and concentrated by evaporation.

Yield of crude product: 1487 g.

1487 g of the crude product were hydrogenated at 100° C. and 140 bar hydrogen with 90 g of Raney nickel and 400 ml of liquid ammonia. The product was suction filtered, concentrated by evaporation and distilled. Bp. 70° C. at 0.1 mbar, yield 1320 g, purity according to GC: 98.2%.

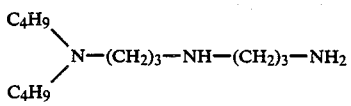  2.

565 ml of acrylonitrile were added dropwise to 1600 g (8.6 m) of di-n-butyl-propylenediamine in 500 ml of methanol at 20° C.; the reaction mixture was stirred overnight and concentrated by evaporation.

Yield of crude product: 2086 g.

2086 g of crude product were hydrogenated at 100° C. and 140 bar hydrogen with 120 g of Raney nickel and 400 ml of liquid ammonia. The product was suction filtered, concentrated by evaporation and distilled. Bp. 127° C. at 0.1 mbar, yield 1750 g, purity according to GC: 99.9%.

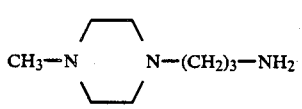  3.

330 ml of acrylonitrile were added dropwise to 500 g of methylpiperazine in 500 ml of methanol at 25° C. The reaction mixture was stirred overnight and concentrated by evaporation. 768 g of the nitrile were obtained and then hydrogenated in 300 ml of liquid ammonia with 80 g of Raney nickel at 100° C. and 80 bar hydrogen.

The product was suction filtered, concentrated by evaporation and distilled. Bp. 47° C. at 0.01 mbar, yield 690 g, purity according to GC: 100%.

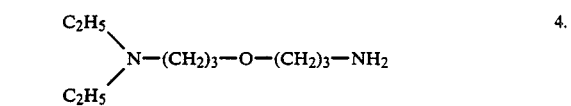  4.

0.5 g of Na was added to 1170 g (10 m) of diethylethanolamine and dissolved. 660 ml of acrylonitrile were then added at 25° C. The reaction mixture was stirred overnight and concentrated by evaporation. 1711 g of nitrile were obtained.

1670 g of the nitrile were hydrogenated at 90° C. and 140 bar hydrogen with 1500 ml of liquid ammonia and 250 g of Raney nickel.

The product was suction filtered, concentrated by evaporation and distilled. Bp. 60° C. at 0.01 mbar, yield 1330 g purity according to GC: 97.3%.

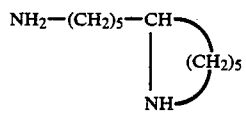  5.

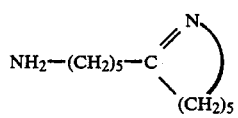  5.1

1130 g of ε-caprolactam and 1200 g of CaO were heated to 500° C. and the resulting reaction product was distilled off. It was then boiled under reflux with 1000 ml of a 20% sodium hydroxide solution and cooled; the upper phase was purified by distillation. Bp. 120° to 123° C. at 3.5 mbar, yield 550 g (corresponding to 57% of the theoretical amount).

Hydrogenation:

2.5 kg of compound 5.1 were hydrogenated with 200 g of Raney nickel at 70° C. and a hydrogen pressure of 180 bar for 20 hours. The product was separated from the catalyst after cooling and distilled. Bp. 90° C. at 0.1 mbar, yield 2320 g (corresponding to 92% of the theoretical amount), Purity according to GC: 99.9%.

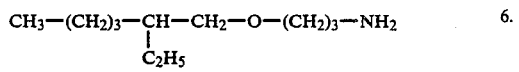  6.

0.5 g of Na was added to 1300 g of 2-ethylhexanol-1 and dissolved, and 660 ml of acrylonitrile were then added dropwise at 30° C. The reaction mixture was stirred overnight and concentrated by evaporation.

1830 g of the nitrile were hydrogenated at 90° C. and 120 bar of hydrogen with 1600 ml of liquid ammonia and 270 g of Raney nickel and the product was suction filtered and distilled. Bp.: 95° C. at 32 mbar, yield: 1500 g, purity according to GC: 99.2%

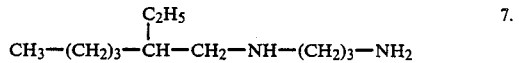  7.

265 g of acrylonitrile were added dropwise to 645 g of 2-ethyl-hexylamine in 500 ml of methanol and the reaction mixture was stirred overnight and concentrated by evaporation. 900 g nitrile were obtained. The nitrile was hydrogenated at 100° C. and a hydrogen pressure of 150 bar in 500 ml of methanol with 300 ml of liquid ammonia and 75 g of Raney nickel. The reaction product was suction filtered and distilled. Bp: 62° C. at 0.01 mbar, yield: 721 g, purity according to GC: 98.5%.

8.
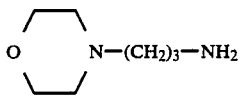

660 ml of acrylonitrile were added dropwise at 20° C. to 870 g of morpholine dissolved in 500 ml of methanol. The reaction mixture was then stirred overnight and concentrated by evaporation and the nitrile obtained was hydrogenated at a hydrogen pressure of 120 bar at 100° C. in the presence of 75 g of Raney nickel and 300 ml of liquid ammonia. The reaction product was suction filtered and distilled. Bp.: 103° C. at 15 mbar, yield: 1360 g, purity according to GC: 99.5%.

9.
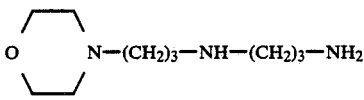

660 ml of acrylonitrile were added dropwise at 20° C. to 1440 g of aminopropylmorpholine dissolved in 500 ml of methanol and the reaction mixture was stirred overnight and concentrated by evaporation. The nitrile obtained was hydrogenated at 100° C. and a hydrogen pressure of 140 bar in the presence of 90 g of Raney nickel and 400 ml of liquid ammonia. The reaction product was suction filtered and distilled. Bp: 75° C. at 0.1 mbar, yield: 1900 g, purity according to GC: 98.7%.

Examples 10 and 11

(Process according to the invention)

and

Examples 12 and 13

(Comparison Examples)

Components I and II used in the following Examples were processed by reaction injection molding (RIM).

The polyisocyanate component and the polyol mixture were introduced into a high pressure apparatus and after vigorous mixing in a force controlled mixing head the resulting mixture, was rapidly forced into a metal mold.

The mold was made of tool steel in the form of a bowl and was designed to produce molded parts having the following dimensions:

| | |
|---|---|
| External diameter of base | 178 mm |
| External diameter of rim | 186 mm |
| Wall thickness | 4 mm |
| Height | 68 mm |
| Cone angle | 3.50° |
| Sprue: Swelling sprue centrally at the base ($\phi$ 10 mm). | |

Powerful shearing forces must be overcome at the wall surface for removing the bowl. A force transducer with a wire strain gauge was used as a measuring element to determine the opening forces (Hottinger Baldwin Messtechnik GmbH, D-6100 Darmstadt 1).

The temperature of the raw materials was 45° C. and the temperature of the mold was 65° C. The dwell time in the mold was adjusted to 20 sec. and the operating cycle to 60 sec.

Before production of the first molded part, the surface of mold was treated with a commercial mold release agent (RTCW 2006, Manufacturers Chem-Trend International, 3205 E, Grand River, Howell, Mich. 48843/US).

Example 10

1.80 parts by weight of zinc stearate (Haro Chem ZGD, Manufacturers Haro Chem*) were dissolved in 1.80 parts by weight of N-(3-diethylaminopropyl)-1,3-propane diamine and combined with 74.98 parts by weight of a polyether having an OH number of 28 which was obtained by the addition of propylene oxide and then ethylene oxide, to trimethylolpropane (ratio by weight PO:EO=83:17), 20.70 parts by weight of a mixture of 65 parts by weight of 1-methyl-3,5-diethyl-phenylenediamine-(2,4) and 35 parts of 1-methyl-3,5-diethyl-phenylenediamine-(2,6), 0.18 parts by weight of dimethyl tin dilaurate and 0.54 parts by weight of 1,4-diazabicyclo-(2,2,2)-octane in the form of a 33% solution (Dabco 33 LV, Air Products)

to form polyol component II which was then reacted with 58.2 parts by weight of the reaction product of tripropylene glycol and 4,4'-diphenylmethane diisocyanate (23% by weight NCO) by the RIM process.

*Haagen Chemie b.V.
P.O. Box 14
6040 AA Roermond (Holland)

The series of experiments was stopped after 50 products had been removed from the mold. The opening force required for removal of the last article from the mold was found to be 11.7 kN (see Table).

Polyol formulation II was left in the RIM plant and tested again after 3 days. 50 successive molded products could easily be removed from the mold. The opening force required for the last removal from the mold was found to be 17.7 kN. At this stage, the polyol formulation was still clear and no cloudiness due to precipitating zinc strearate could be observed.

Example 11

1.80 parts by weight of zinc stearate of the type used in Example 10 were dissolved in 1.80 parts by weight of N-(3-aminopropyl)-N'-methyl-piperazine and combined with 74.98 parts by weight of a polyether having an OH number of 28 which was obtained by the addition of propylene oxide then ethylene oxide to trimethylolpropane (ratio by weight PO:EO=83:17), 20.70 parts by weight of a mixture of 65 parts by weight of 1-methyl-3,5-diethyl-phenylenediamine-(2,4) and 35 parts by weight of 1-methyl-3,5-diethyl-phenylene diamine-(2,6), 0.18 parts by weight of dimethyl tin dilaurate and 0.54 parts by weight of 1,4-diazabicyclo-(2,2,2)-octane in the form of a 33% solution (Dabco 33 LV, Air Products), to form a polyol component II which was reacted with 56.7 parts by weight of a reaction product of tripropylene glycol and 4,4'-diphenylmethanediisocyanate (23% by weight NCO) by the RIM process.

The experimental series was stopped after 50 removals from the mold. The opening force measured for the last removal from the mold was 9.4 kN (see Table).

Polyol formulation II was left in the RIM plant and again tested after 3 days. 50 Removals from the mold could be carried out without effort. The opening force measured for the last removal was 11.7 kN. The polyol formulation was still clear at this stage and free from any cloudiness due to precipitating zinc stearate.

Example 12

(Comparison)

1.80 parts by weight of zinc stearate of the type used in Example 10 were dissolved in 1.80 parts by weight of an amine-started poly(oxyalkylene)polyether tetrol with OH number about 630 obtained by the addition of about 5 mol of propylene oxide to 1 mol of ethylene diamine and the solution obtained was combined with 74.98 parts by weight of a polyether having an OH number of 28 which was obtained by the addition of propylene oxide and then ethylene oxide to trimethylolpropane (ratio by weight PO:EO=83:17), 20.70 parts by weight of a mixture of 65 parts by weight of 1-methyl-3,5-diethyl-phenylenediamine-(2,4) and 35 parts of 1-methyl-3,5-diethyl-phenylenediamine-(2,6), 0.18 parts by weight of dimethyl tin dilaurate and 0.54 parts by weight of 1,4-diazabicyclo-(2,2,2)-octane in the form of a 33% solution (Dabco 33 LV, Air Products)

to form a clear polyol component II which was reacted with 58.4 parts by weight of a reaction product of tripropylene glycol and 4,4'-diphenylmethane-diisocyanate (23% by weight NCO) by the RIM process.

The experimental series was stopped after 50 removals from the mold. An opening force of 11.0 kN was measured at the last removal (see Table).

The polyol formulation was left in the RIM plant and tested again after one day. The last removal from the mold required an opening force of 14.4 kN. The polyol formulation had become cloudy due to precipitated zinc stearate.

Example 13

(Comparison)

1.80 parts by weight of zinc stearate of the type used in Example 10 were dissolved in 1.80 parts by weight of a bifunctional polyether terminated with primary amino groups and having a molecular weight of approximately 400 (Jeffamine D 400 from Texaco) and the solution obtained was combined with 74.98 parts by weight of a polyether having an OH number of 28 which was prepared by the addition of propylene oxide and then ethylene oxide to trimethylolpropane (ratio by weight PO:EO=83:17), 20.70 parts by weight of a mixture of 65 parts by weight of 1-methyl-3,5-diethyl-phenylenediamine-(2,4) and 35 parts by weight of 1-methyl-3,5-diethyl-phenylenediamine-(2,6), 0.18 parts by weight of dimethyl tin dilaurate and 0.54 parts by weight of 1,4-diazabicyclo-(2,2,2)-octane in the form of a 33% solution (Dabco 33 LV, Air Products)

to form a clear polyol component II which was reacted with 56.2 parts by weight of a reaction product of tripropylene glycol and 4,4'-diphenylmethanediisocyanate (23% by weight NCO) by the RIM process.

The experimental series was stopped after 26 removals from the mold. An opening force of 13.2 kN was measured at the last removal and no subsequent molded parts could be removed from the mold.

TABLE

| EXAMPLE | TEST | Opening Force (kN) 10th Molded Part | Opening Force (kN) 25th Molded Part | Opening Force (kN) 50th Molded Part | Appearance of Polyol Formulation After Storage at 20° C. |
|---|---|---|---|---|---|
| 10 | Immediate | 4.4 | 7.1 | 11.7 | Clear |
|    | After 3 days | 4.7 | 9.6 | 17.7 | Clear |
| 11 | Immediate | 4.7 | 6.5 | 9.4 | Clear |
|    | After 3 days | 4.6 | 7.3 | 11.7 | Clear |
| 12 | Immediate | 5.6 | 8.0 | 11.0 | Clear |
|    | After 1 day | 6.1 | 9.2 | 14.4 | Cloudy, Sediment |
| 13 | Immediate | 8.1 | 12.8 | — | Clear |
|    | After 1 day | — | — | — | Cloudy, Sediment |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mold release composition comprising a solution, which is liquid at room temperature, of
  (A) about 10 to 75% by weight, based on the total weight of component (A) and (B), of at least one zinc salt of a straight chain or branched, saturated or unsaturated aliphatic carboxylic acid having 8 to 24 carbon atoms in
  (B) at least one organic compound which is liquid at room temperature and corresponds to the formula $$H_2N-(-CH_2)_m-X$$

wherein
X denotes an organic group containing nitrogen and/or oxygen, selected from

(i)

(ii)

(iii)

(iv) and (v)

wherein
$R^1$ and $R^2$ denote identical or different alkyl groups having 1 to 10 carbon atoms or together with the nitrogen atom and optionally oxygen or a $C_1-C_5$-alkyl substituted nitrogen atom as an additional hetero atom form a heterocyclic ring with 6 ring atoms, R³ and R⁴ denote identical or different alkyl groups having 2 to 10 carbon atoms or together with the nitrogen atom and optionally an oxygen atom or a C₁–C₅-alkyl substituted nitrogen atom as an additional hetero atom form a heterocyclic ring with 6 ring atoms, R⁵ denotes a straight chain or branched alkyl group having 2 to 10 carbon atoms or a group corresponding to the formula

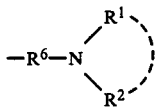

wherein

R⁶ denotes a straight chain or branched alkylene group having 2 to 8 carbon atoms and R¹ and R² have the meanings already indicated, R⁷ denotes an alkyl group having 3 to 10 carbon atoms, m represents an integer with a value from 2 to 10 n represents an integer with a value from 2 to 5 and o represents an integer with a value from 2 to 8.

2. The mold release composition of claim 1 wherein component (A) comprises zinc stearate.

3. A mixture suitable as a reactant for organic polyisocyanates which comprises
  (a) at least one organic compound in the molecular weight range of 400 to about 12,000 containing at least two isocyanate reactive groups,
  (b) about 5 to 50% by weight, based on the weight of component (a), of at least one organic compound in the molecular weight range of 62 to 399 which contains isocyanate reactive hydrogen atoms and is difunctional in isocyanate addition reactions and
  (c) the mold release composition of claim 1 in an amount such that the mixture contains about 0.5 to 10 parts by weight of zinc salt per 100 parts by weight of component (a).

4. The mixture of claim 3, characterized in that component (a) comprises at least one polyether in the molecular weight range of about 1800 to 12,000 containing 2 or 3 isocyanate reactive groups selected from the group consisting of primary alcoholic hydroxyl groups, secondary alcoholic hydroxyl groups and primary amino groups and component (b) comprises 1-methyl-3,5-diethyl-2,4-diaminobenzene or a mixture of this diamine with up to 35% by weight of 1-methyl-3,5-diethyl-2,6-diaminobenzene.

5. A mixture of claim 3 wherein said zinc salt is zinc stearate.

6. A mixture of claim 4 wherein said zinc salt is zinc stearate.

7. A process for the production of elastomeric molding products having a compact surface layer of polyurethane- or polyurea-elastomers which comprises reacting inside a closed mold a reaction mixture comprising
  (I) a polyisocyanate component comprising at least one di- or polyisocyanate containing aromatically bound isocyanate groups with
  (II) the mixture of claim 3.

8. The process of claim 7 wherein component (I) is a polyisocyanate or polyisocyanate mixture of the diphenyl-methane series which is liquid at room temperature and optionally contains urethane, carbodiimide and/or uretoneimine groups.

9. The molded product obtained according to claim 7.

10. The mold product obtained according to claim 8.

11. The mold release composition of claim 1 which additionally comprises up to about 80% of a compound which has a molecular weight of 62 to 399, is difunctional in isocyanate addition reactions and contains aromatically bound primary amino groups.

12. A mold release composition of claim 11 wherein said compound comprises 1-methyl-3,5-diethyl-2,4-diaminobenzene or a mixture of this diamine up to 35% by weight of 1-methyl-3,5-diethyl-2,6-diaminobenzene.

13. The mold release composition of claim 2 which additionally comprises up to about 80% of a compound which has a molecular weight of 62 to 399, is difunctional in isocyanate addition reactions and contains aromatically bound primary amino groups.

14. A mold release composition of claim 13 wherein said compound comprises 1-methyl-3,5-diethyl-2,4-diaminobenzene or a mixture of this diamine up to 35% by weight of 1-methyl-3,5-diethyl-2,6-diaminobenzene.

* * * * *